(12) United States Patent
LaVelle (10) Patent No.: US 7,335,134 B1
(45) Date of Patent: Feb. 26, 2008

(54) EXERCISE AND GAME CONTROLLER APPARATUS AND METHOD

(76) Inventor: Richard LaVelle, 7001 Dove Dr., Schereville, IN (US) 46375

( * ) Notice: Subject to any disclaimer, the term of this patent is extended or adjusted under 35 U.S.C. 154(b) by 672 days.

(21) Appl. No.: 10/784,338

(22) Filed: Feb. 23, 2004

(51) Int. Cl.
*A63B 15/02* (2006.01)
*A63B 26/00* (2006.01)
*A63F 13/00* (2006.01)

(52) U.S. Cl. .............................. 482/1; 482/140; 463/36
(58) Field of Classification Search ................ 482/140, 482/1–8, 121; 463/36, 38
See application file for complete search history.

(56) References Cited

U.S. PATENT DOCUMENTS

| | | | |
|---|---|---|---|
| 4,382,166 A | 5/1983 | Kim | |
| 4,489,938 A | 12/1984 | Darzinskis | |
| 4,512,567 A | 4/1985 | Phillips | |
| 4,542,897 A | 9/1985 | Melton et al. | |
| 4,630,817 A * | 12/1986 | Buckley | 463/37 |
| 4,711,447 A | 12/1987 | Mansfield | |
| 4,925,189 A | 5/1990 | Braeunig | |
| 4,976,435 A | 12/1990 | Shatford et al. | |
| 5,054,771 A * | 10/1991 | Mansfield | 463/36 |
| 5,076,584 A | 12/1991 | Openiano | |
| 5,139,261 A | 8/1992 | Openiano | |
| 5,195,746 A | 3/1993 | Boyd et al. | |
| 5,362,069 A | 11/1994 | Hall-Tipping | |
| 5,388,990 A | 2/1995 | Beckman | |
| 5,431,569 A | 7/1995 | Simpkins et al. | |
| 5,437,453 A * | 8/1995 | Hineman | 463/38 |
| 5,568,928 A | 10/1996 | Munson et al. | |
| 5,645,513 A * | 7/1997 | Haydocy et al. | 482/57 |
| 5,782,639 A * | 7/1998 | Beal | 434/29 |
| 5,805,138 A * | 9/1998 | Brawne et al. | 345/156 |
| 5,890,995 A | 4/1999 | Bobick et al. | |
| 5,913,727 A | 6/1999 | Ahdoot | |
| 5,980,256 A * | 11/1999 | Carmein | 434/55 |
| 6,022,303 A * | 2/2000 | Abdo | 482/140 |
| 6,195,592 B1 | 2/2001 | Schuler et al. | |
| 6,244,988 B1 | 6/2001 | Delman | |
| 6,727,884 B1 * | 4/2004 | Leatham et al. | 345/156 |
| 7,125,074 B2 * | 10/2006 | Real et al. | 297/217.3 |
| 2002/0055422 A1 | 5/2002 | Airmet et al. | |
| 2002/0160883 A1 | 10/2002 | Dugan | |

FOREIGN PATENT DOCUMENTS

| | | |
|---|---|---|
| GB | 2.190.303 | 11/1987 |
| WO | WO96/05766 | 2/1996 |
| WO | WO96/06664 | 3/1996 |
| WO | WO96/36399 | 11/1996 |
| WO | WO97/05926 | 2/1997 |
| WO | WO99/00782 | 1/1999 |

* cited by examiner

*Primary Examiner*—Fenn C. Mathew
(74) *Attorney, Agent, or Firm*—Michael I Kroll (57) ABSTRACT

An apparatus and method for an exercise apparatus incorporating sensor means 30 for translating body movement imparted to the exercise apparatus by the user 20 that is measured and transmitted to a video game 34 as commands generated by the sensor enhanced exercise apparatus forming the user control interface 36. The exercise apparatus 10 has a platform 12 with a resistive member 14 extending therefrom along with arms 16 fastened to the resistive member forming a cradle for the user 20 and extending outwardly terminating in hand grips 18. The present invention 10 moves and senses motion in the transverse 24, anterior-posterior 26 and longitudinal 28 axis.

14 Claims, 9 Drawing Sheets

EXERCISE AND GAME CONTROLLER APPARATUS AND METHOD

BACKGROUND OF THE INVENTION

1. Field of the Invention

The present invention relates generally to control devices and, more specifically, to an exercise apparatus and method incorporating sensor means for translating body movement imparted to the exercise apparatus by the user that is measured and transmitted to a video game as commands generated by the sensor enhanced exercise apparatus forming the user control interface.

The exercise apparatus has a platform with a resistive member extending therefrom along with arms fastened to the resistive member forming a cradle for the user and extending outwardly terminating in hand grips.

The platform supports the user during exercising, whether the user is standing or sitting, with the preferred embodiment having the platform serving as a seat for the user.

The resistive member extends stanchion-like from the platform having the property of elasticity, where the flexible member would return to its original form after deformation by applied forces from the user including torsional and flexuous. The property of elasticity may be imparted to the stanchion-like member through construction comprising composite materials or inclusion of an element within the stanchion-like member, such as a spring.

The present invention also provides for an additional element in the form of the inclusion of an adjustable resistive member whereby a user can increase or decrease the resistance of the resistive member to deformation, thereby enabling the user to enhance their workout.

The spaced apart arms incorporating handgrips provides means for a user to impart flexuous or torsional forces to the resilient member through movement of the user. In addition to incorporating means for generating additional commands within the hand grips in the form of a plurality of buttons and/or switches.

The purpose of the present invention is to induce users to exercise more through entertainment of the user by translating body movement during an exercise regiment into discernable commands for a video game, thereby creating an atmosphere conductive to continued exercise.

There are any number of movements capable by a user through a 360 degree horizontal plane with each of those flexuous points having the possibility of torsional loads also applied, while it is certainly possible to convey mathematically each of these point, for simplicity sake, the sensor electronics is defined as capable of discerning movement through three planes with the understanding that there are an infinite number of potential combinations within X, Y, and Z planes. Also, for the purposes of simplicity, the actual muscle groups used to accomplish user movement are reduced to a simple correlation between the stanchion-like resistive member and the user's spine, with the aforementioned planes formed basically by perpendicular planes formed by a user bending side to side, forward and backward and rotation.

Taking a starting position of a user sitting erect, torsional forces are applied through rotation along the longitudinal axis of the body, or more simply twisting the spine. Flexion forces can be applied either through the transverse axis, bending side to side, or through the anterior-posterior axis, bending forward or backward. Each of the forces are reciprocated within the resilient member that incorporates sensor means for capturing and communicating said body movement to the video game software.

The sensor enhanced exercise apparatus forms the user control interface responsible for measuring flexuous and torsional forces applied to the exercise apparatus' resistive member and transmitting those signals to the software application, which will determine how those interface signals are displayed.

The present invention also provides for an additional element in the form of force/vibration feedback (rumble) wherein the resistive member incorporates mechanical means for causing flexuous forces to the resistive member in response to software application instruction, such as feedback from firing a missile.

2. Description of the Prior Art

There are other exercise and game control devices designed for exercise devices. Typical of these is U.S. Pat. No. 4,382,166 issued to Kim on May 3, 1983.

Another patent was issued to Darzinskis on Dec. 25, 1984 as U.S. Pat. No. 4,489,938. Yet another U.S. Pat. No. 4,512,567 was issued to Phillips on Apr. 23, 1985 and still yet another was issued on Sep. 24, 1985 to Melton, et al. as U.S. Pat. No. 4,542,897.

Another patent was issued to Openiano on Aug. 18, 1992 as U.S. Pat. No. 5,139,261. Yet another U.S. Pat. No. 5,362,069 was issued to Hall-Tipping on Nov. 8, 1994. Another was issued to Bobick, et al. on Apr. 6, 1999 as U.S. Pat. No. 5,890,995 and still yet another was issued on Jun. 22, 1999 to Ahdoot as U.S. Pat. No. 5,913,727.

Another patent was issued to Schuler, et al. on Feb. 27, 2001 as U.S. Pat. No. 6,195,592. Yet another U.S. Pat. No. 6,244,988 was issued to Delman on Jun. 12, 2001. Another was issued to Treftlin on Mar. 7, 1996 as WIPO Patent No. WO 96/06664 and still yet another was issued on Feb. 20, 1997 to Jarvik as WIPO Patent No. WO 97/05926.

U.S. Pat. No. 4,382,166

Inventor: Syng N. Kim

Issued: May 3, 1983

A joystick apparatus includes a tiltably mounted tube and a rod reciprocally movably axially therethrough. The tube has a frustoconical first actuator at one end thereof for operating engagement with a selected one or more of a plurality of first switches as the tube is tilted. The adjacent end of the rod carries a part-spherical second actuator for operating engagement with a second switch when the rod is extended from the tube, the shape of the second actuator keeping it in proper operating relationship with respect to the second switch regardless of the position of the tube.

U.S. Pat. No. 4,489,938

Inventor: Kazimir R. Darzinskis

Issued: Dec. 25, 1984

The combination of an elastomeric physical exercise device and a video computer apparatus arranged for manual operation or play of the game by the person using the exercise function of the combination for simultaneous physical exercise and wherein the "fire" operation of a game play is actuated solely through operation of the elastomeric portion of the apparatus.

U.S. Pat. No. 4,512,567

Inventor: Robert V. Phillips

Issued: Apr. 23, 1985

An exercise bicycle is associated with controllable apparatus such as potentiometers which provide an electrical signal based on the motion of the handlebars as well as signals proportional to the speed at which the bicycle is being operated. These signals are interfaced with a typical microcomputer or video game machine which can utilize these signals to control the motions necessary to operate a video game. In this manner the apparatus generates five separate control signals one of which is indicative of the speed that the bicycle is being pedaled, the left to right movement of the handlebars as well as the forward to backward or up and down movement of the handlebars. There are associated with the handlebars two separate switches which can further be activated by the operator. In this manner the exercise bicycle is used to control and fully operate the video game thereby allowing a user to receive healthful exercise while participating in the skills necessary to play the video game.

U.S. Pat. No. 4,542,897

Inventor: Donald L. Melton, et al.

Issued: Sep. 24, 1985

An exercycle combined with a video game computer and game control allows the physical effort of the operator to generate electrical current for operation of the game control permitting the operator to control and interact with the computer upon maintaining a predetermined level of physical effort. Although the computer is activated by a separate power source, the generator, upon attainment of a predetermined energy expenditure level, activates the computer game. The apparatus provides amusement and an incentive to perform monotonous exercise routines as well as developing mental and manual coordination skills simultaneously with physical development.

U.S. Pat. No. 5,139,261

Inventor: Renato M. Openiano

Issued: Aug. 18, 1992

A controller electrically interfaced to a video game computer or the like for the purpose of controlling a progression of the video game or the like is selectively actuated by discrete motions and forces the locations, magnitudes, and orientations of which are variably predetermined by the user. Pressure, or proximity, sensor units, normally four in number, are independently placeable upon any surface, and normally upon a floor. The signals produced by the arbitrarily located pressure or proximity sensors are received by a video game control unit and used to produce electrical signals suitable to be received by a conventional video game computer or the like for the purpose of controlling the progression of the video game. An adjustable sensor cartridge assembly for use with a video game controller allows a user to selectively position the sensor within the collar's cavity and relative to the human user. Because the spatial arrangements of the various sensors, and the selection of the forces to be applied thereto, are completely arbitrary, the user is in complete control of the nature and location and magnitude of those motions and forces that he or she must provide, at a preselected degree of difficulty, to the game controller in order to sequence the video game.

U.S. Pat. No. 5,362,069

Inventor: Justin Hall-Tipping

Issued: Nov. 8, 1994

A person simultaneously plays a video game and operates an exercise device, such as an exercise bicycle. A first sensor generates an output level signal indicative of the output level (e.g., pedal speed) of the exercise device. A second sensor generates an aerobic activity level (e.g., heart rate) signal indicative of the aerobic activity level of the exerciser. The output level signal affects the play of the video game. If the aerobic activity level signal is too low, the exercise device is made more difficult to operate and the play of the video game is altered to encourage the exercise to increase the output level of the exercise device. The play of the video game is also affected by signals generated by joystick controls operated by the exerciser's hands.

U.S. Pat. No. 5,890,995

Inventor: Aaron F. Bobick, et al.

Issued: Apr. 6, 1999

An interactive exercise apparatus engages a user's mind and body. The apparatus comprises an exercise mechanism, a steering mechanism, and a control mechanism for manipulation by the user to achieve exercise, to indicate a direction of motion, and to interact with virtual objects in a simulated environment. The exercise mechanism can be, for example, the steps of a stair climbing simulator or the pedals of a bicycle, preferably a recumbent bicycle. A simulated environment (e.g., an interactive simulated three-dimensional environment or an interactive simulated three-dimensional fluid environment) is generated by a computer and displayed on a display system for the user. In one embodiment, the simulated environment comprises an enclosed space representing a game field. In this embodiment, an interactive competitive ball game is played using networked exercise apparatus. The user manipulates the exercise mechanism, the steering mechanism, and the control mechanism to travel throughout the game field and interact with virtual objects to score points. The computer controls the exercise mechanism and monitors the exercise mechanism, the steering mechanism, and the control mechanism to determine user position and the position of virtual objects in the simulated environment. The display provides a visual display of the user's position and the position of virtual objects in the simulated environment. A plurality of the interactive exercise apparatus can be networked together to allow group participation and competition in the simulated game.

U.S. Pat. No. 5,913,727

Inventor: Ned Ahdoot

Issued: Jun. 22, 1999

An interactive contact and simulation game apparatus in which a player and a three dimensional computer generated image interact in simulated physical contact. Alternately, two players may interact through the apparatus of the invention. The game apparatus includes a computerized control means generating a simulated image or images of the players, and displaying the images on a large display means. A plurality of position sensing and impact generating means are secured to various locations on each of the player's bodies. The position sensing means relay information to the control means indicating the exact position of the player. This is accomplished by the display means generating a moving light signal, invisible to the player, but detected by the position sensing means and relayed to the control means. The control means then responds in real time to the player's position and movements by moving the image in a combat strategy. When simulated contact between the image and the player is determined by the control means, the impact generating means positioned at the point of contact is activated to apply pressure to the player, thus simulating contact. With two players, each player sees his opponent as a simulated image on his display device.

U.S. Pat. No. 6,195,592

Inventor: Charles L. Schuler, et al.

Issued: Feb. 27, 2001

A method and apparatus implementing a user interface device, such as a mouse or trackball, having electronically controllable tactile responsiveness which is flexibly programmable. A user interface device effects positioning of a cursor within a limited area, such as on a display screen, with limits imposed by controllable tactile responsiveness. Programmable force-position characteristics relate the tactile responsiveness of the interface device to the position of the cursor within the limited area or on the display screen. In a described embodiment, the interface device includes at least two sets of wheels that move as the interface device is actuated. The at least two sets of wheels are aligned on mutually orthogonal axes. A servo motor is attached to each of the at least two sets of wheels. A position encoder is associated with each servo motor and outputs position information to a controller that has access to force-position relation information that is a function of a screen display on which the cursor is manipulated. The controller outputs a digital signal, in accordance with the force-display position relation information. The digital signal is converted to an analog current signal applied to the servo motor(s) to generate force in the servo motor. The force, presenting a tactile response to a human interacting with the user interface device, is perceived as a resistance, tactile pressure or lack thereof, or as a positive, assisted motion which is indicative of position on a screen display.

U.S. Pat. No. 6,244,988

Inventor: David H. Delman

Issued: Jun. 12, 2001

An improved interactive exercise system is disclosed. A simplified device for connecting fitness equipment such as an exercise bicycle to a computer is equipped with a game control device (e.g. industry standard computers equipped with a joystick or game port adapter). The invention also includes a self-contained exercise device. The act of exercising is converted into signals by a sensor which are then counted by the software and used to control an audio-visual display in such a way that pedaling speed can control the speed of what is been viewed. Hand operated switches allow the user to chose directions when the display indicates the user has come to a turning point. Various exercise parameters and progress towards goals are shown in a window on the display. Parameters and exercise data can be stored, reviewed, and used during other sessions. When used as an interactive exercise touring system, the user can literally pedal his way around the world, through the universe, or even through the human body, seeing the sights on the display screen and listening to a narrator describe what is being seen. By depressing the appropriate touch switches, the user can retrieve more information about a particular area and has the ability to pause the presentation at any time independent of the exercise activity. The device is linkable to other devices so that multiple users can tour a place together or compete against each other.

W.I.P.O. Patent Number WO96/06664

Inventor: Carl Treftlin

Issued: Mar. 7, 1996

An entertainment exercise apparatus for control of a video display or virtual reality system through an effector. For example, an apparatus for use in association with a joystick effector or remote sensing device to control movement of an electronic image on a video display or in a virtual reality system, comprising: a surfboard for user(s) interface, a base platform, a support and tilt control pedestal mounted between said surfboard and said base platform, adapted to support the surfboard while permitting it to be tilted radially thereabouts relative to said base platform, a tilt-bias and limiting means consisting of a plurality of elastic and non-elastic members mounted between the surfboard and the base platform, a joystick effector and a control means to receive an effector such as a joystick and/or a remote sensing device, the arrangement being such that tilting of the surfboard about the support and tilt control pedestal by the operator imparts a corresponding movement to the effector when in place or through a remote sensing device.

W.I.P.O. Patent Number WO97/05926

Inventor: Robert Jarvik

Issued: Feb. 20, 1997

This invention relates to computer controlled exercise machines, and provides the user with a wide variety of interactive exercise options controlled by the software. A "virtual reality" environment or a hybrid of virtual and real environment is provided which permits the user to perform significant physical exertion by applying forces to the machine while viewing images on a head mounted display. The invention includes means for the user to view his own hands and body superimposed over a computer generated image of objects that are not actually present while maintaining parts of the exercise machine that the user physically contacts, such as a handle superimposed over the computer generated image. As the user exerts forces against the machine (such as handle) he perceives that he is exerting forces against the objects the images represent. The invention includes video camera and computer means, adapted to record images from the real world, which may be combined with computer generated images while retaining proper spatial orientation to produce a composite "virtual reality" environment While these devices may be suitable for the purposes for which they were designed, they would not be as suitable for the purposes of the present invention, as hereinafter described.

SUMMARY OF THE PRESENT INVENTION

The present invention discloses an exercise apparatus and method for incorporating sensor means for translating body movement imparted to the exercise apparatus by the user that is measured and transmitted to a video game as commands generated by the sensor enhanced exercise apparatus forming the user control interface. The exercise apparatus has a platform with a resistive member extending therefrom along with arms fastened to the resistive member forming a cradle for the user and extending outwardly terminating in hand grips. The present invention moves and senses motion in the transverse, anterior-posterior and longitudinal axis.

A primary object of the present invention is to provide novel means for interacting with a video game.

Another object of the present invention is to provide a video game having an exercise device forming a joystick.

Yet another object of the present invention is to provide an exercise device having means for generating signals causing movement within a video game.

Still yet another object of the present invention is to provide an exercise device having a seat for a user.

Another object of the present invention is to provide an exercise device having a stanchion with a resistive member forming an integral part therewith.

Yet another object of the present invention is to provide an exercise device having a pair of arms extending from said stanchion with hand grips incorporating fire buttons therein.

Still yet another object of the present invention is to provide an exercise device having sensors incorporated therein whereby movement within said resistive member causes a corresponding movement within said video game.

Additional objects of the present invention will appear as the description proceeds.

The present invention overcomes the shortcomings of the prior art by providing an exercise apparatus having a resistive member therein with a plurality of sensors for sensing motion of the resistive member that is interfaced into a video game causing motion within said game corresponding to the motion of the resistive member. The exercise apparatus further having arms with hand grips that are used to cause motion within said resistive member and wherein said hand grips have buttons mounted thereon that can be depressed to cause a response within said video game, such as fire buttons. Additionally, the exercise apparatus has a feedback module interfaced with said video game whereby certain events occurring within said video game by said exercise apparatus can be feed back into said exercise apparatus feedback module.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

- 10 present invention
- 12 base
- 14 vertical resistive member
- 16 arm member
- 18 hand grip
- 20 user
- 22 arrows
- 24 transverse axis
- 26 anterior-posterior axis
- 28 longitudinal axis
- 30 sensor field
- 32 buttons and switches
- 34 video game
- 36 user control interface
- 38 force/vibration feedback
- 40 trigger
- 42 wheel
- 44 toggle
- 46 360 degree directional button
- 48 throttle
- 50 ⅔ position switch
- 52 other control

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Figure 1:
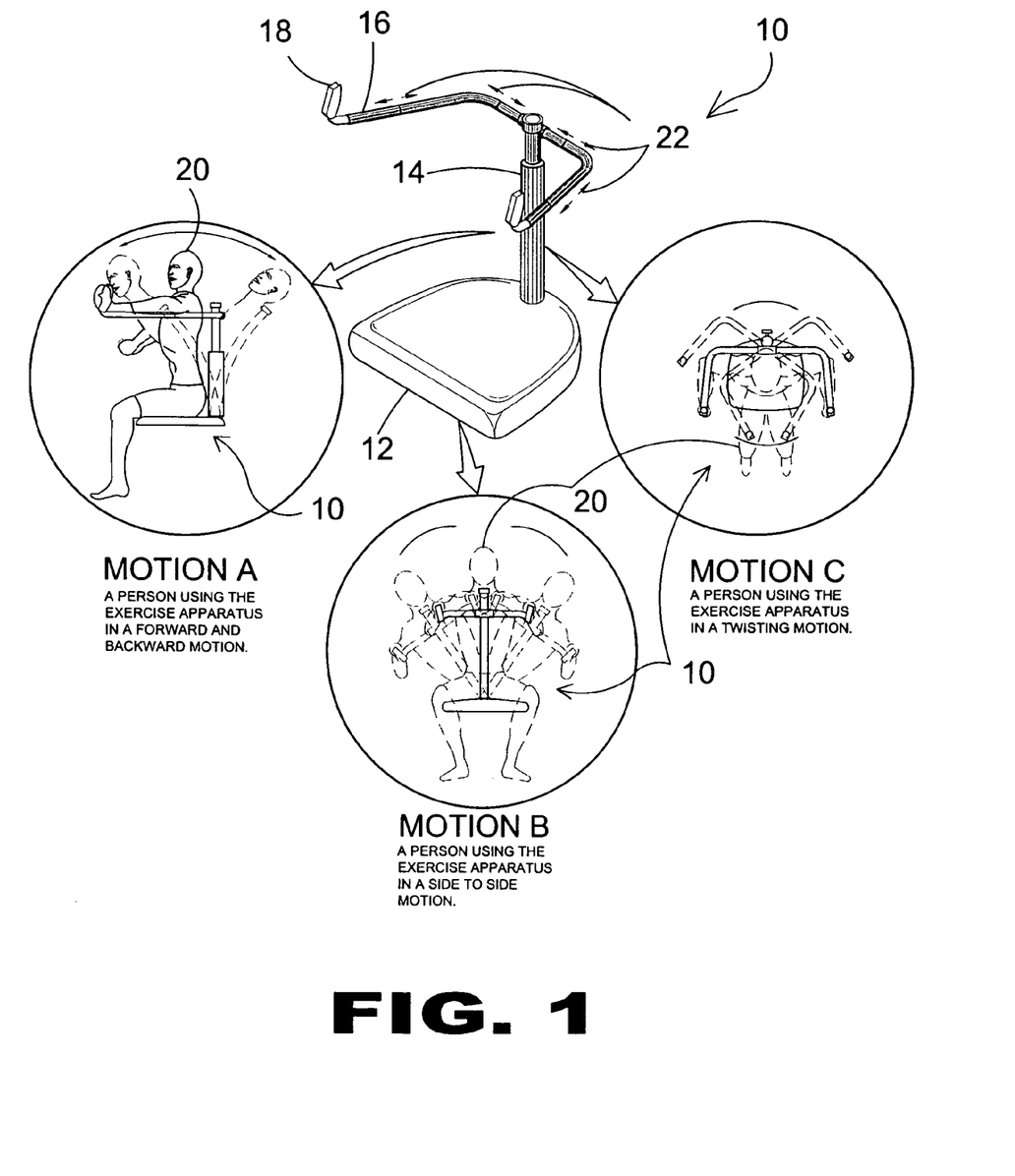
FIG. 1 is an illustrative view of the uses of the present invention.

Turning to FIG. 1, shown therein is an illustrative view of the uses of the present invention 10. The present invention is an exercise apparatus having sensors to detect user 20 movement during an exercise regimen that is translated into commands for video game software. The incorporation of the sensors and exercise apparatus forms the user control interface. The apparatus is comprised of a base platform 12 or seat upon which the user 20 sits or stands with a vertical resistance member 14 extending from the base and an arm support member 16 being length adjustable as shown by arrows at 22 having hand grips 18 located at each distal end. Sensor means are incorporated into the exercise apparatus 10 for measuring forces imparted by the user 20 to the resistive member. Motion A shows a user 20 using the present invention 10 in a forward-backward motion; Motion B shows a side-to-side motion; and Motion C shows a twisting motion.

Figure 2:
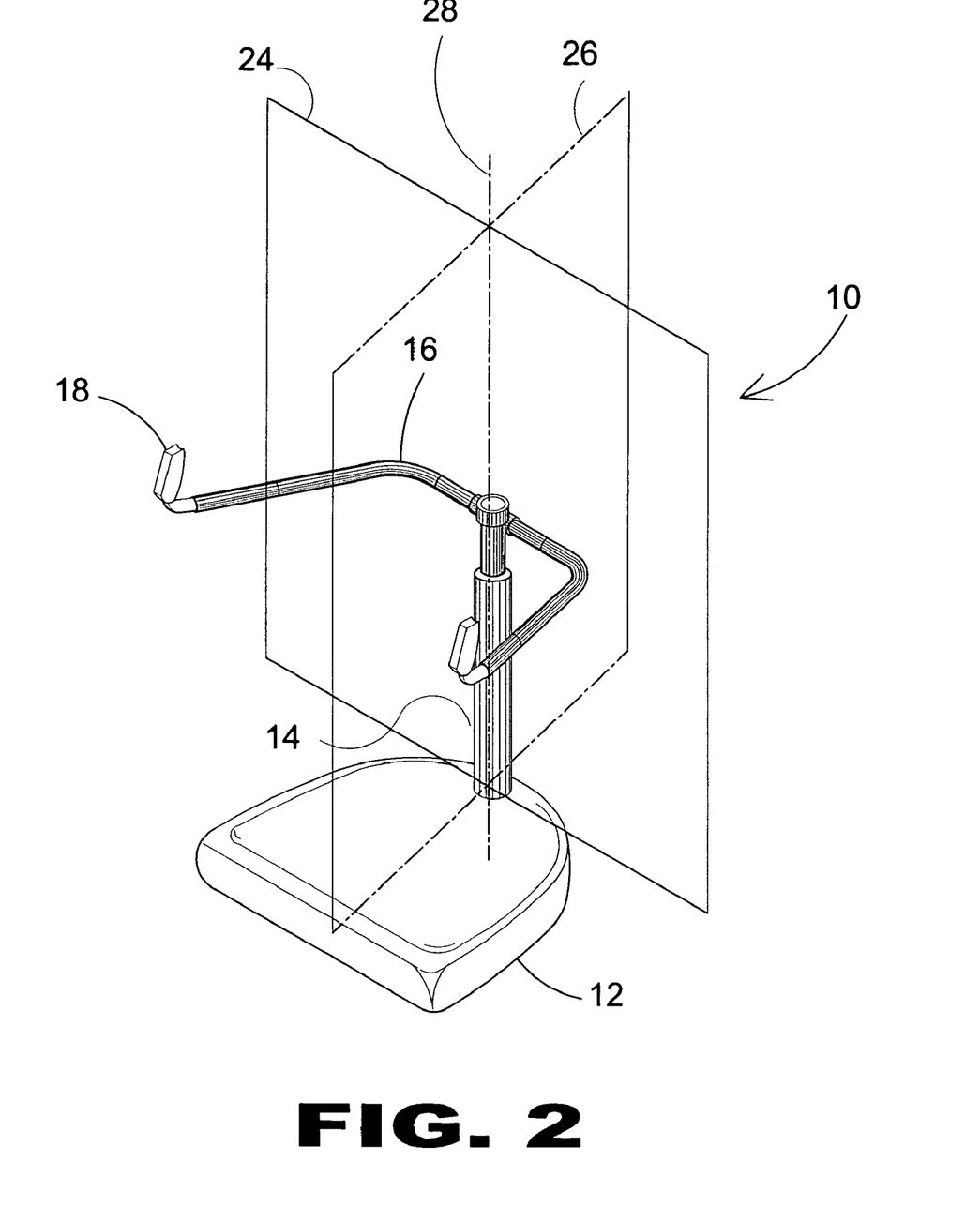
FIG. 2 is a perspective view of the present invention.

Turning to FIG. 2, shown therein is a perspective view of the present invention 10. Shown is the present invention 10 comprising an exercise apparatus comprising a base support member 12 upon which the user sits, a vertical resistance member 14 mounted on the base support with an arm support member 16 having hand grips 18 located at each distal end. The exercise apparatus 10 incorporates sensors that measure movement of the resistive member through a transverse axial plane 24, anterior-posterior axial plane 26, longitudinal axial plane 28 and combinations thereof.

Figure 3:
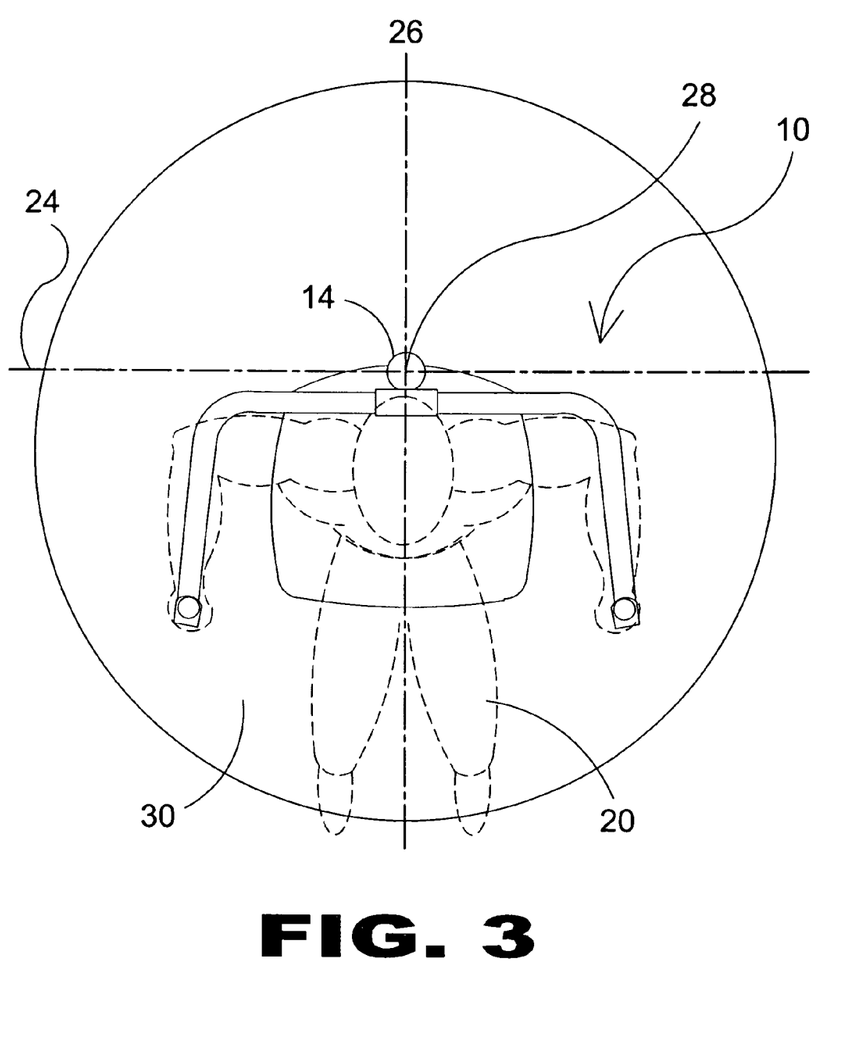
FIG. 3 is an illustrative top view of the present invention in use.

Turning to FIG. 3, shown therein is an illustrative top view of the present invention 10 in use. Shown is a top view of a person 20 positioned on the exercise apparatus of the present invention 10. Body movement of the user 20 through the transverse 24, anterior-posterior 26 and longitudinal 28 axial planes cause reciprocal movement in the resistive member 14 that is measured and transmitted to video game software. The sensor field 30 also indicates combinational axial movement.

Figure 4:
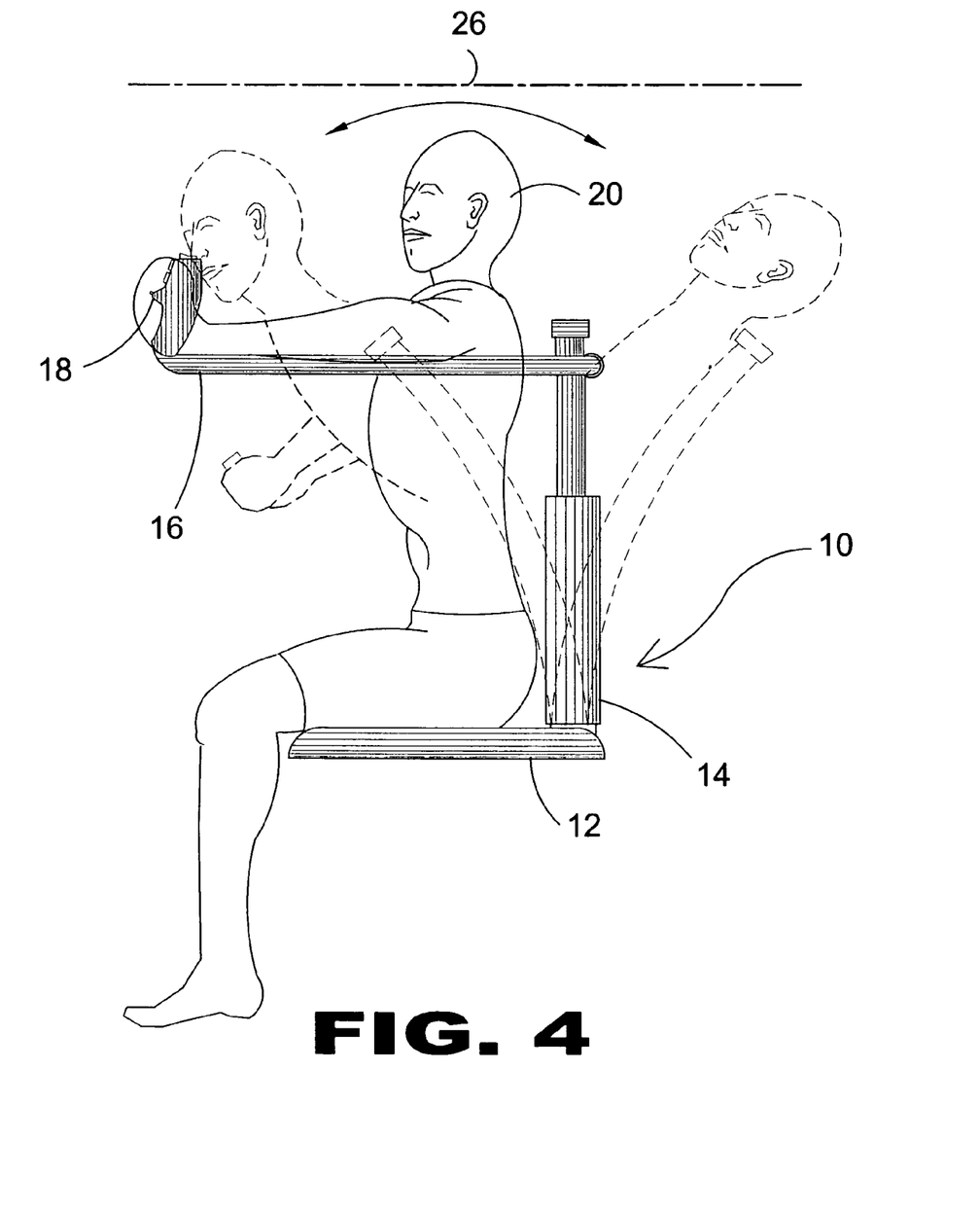
FIG. 4 is an illustrative side view of the present invention in use—motion "A".

Turning to FIG. 4, shown therein is an illustrative side view of the present invention 10 in use—motion "A". Shown is a side view of a person 20 using the exercise apparatus of the present invention 10 performing body movement through the anterior-posterior 26 axial plane that is imparted to the resistive member 14, which has sensor means for measuring and transmitting the movement as commands to video game software. Also shown are base seat 12, arms 16 and hand grips 18.

Figure 5:
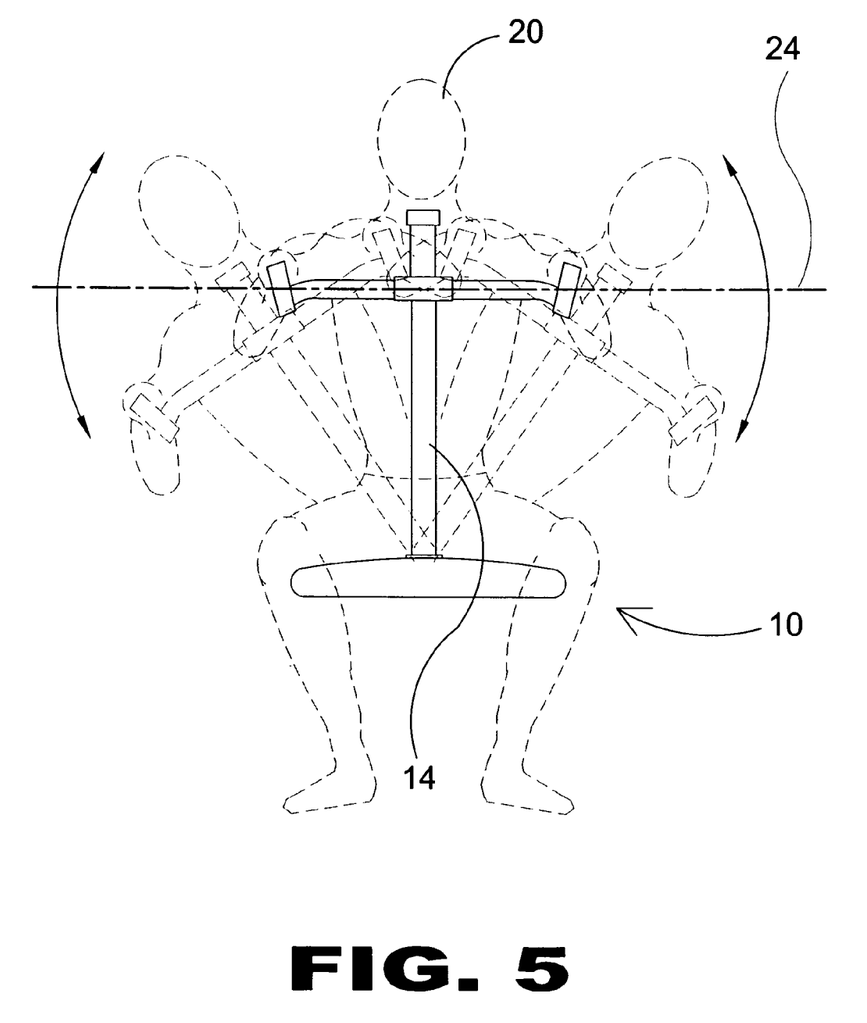
FIG. 5 is an illustrative front view of the present invention in use—motion "B".

Turning to FIG. 5, shown therein is an illustrative front view of the present invention 10 in use—motion "B". Shown is a side view of a person 20 using the exercise apparatus of the present invention 10 performing body movement through the transverse 24 axial plane that is imparted to the resistive member 14, which has sensor means for measuring and transmitting the movement as commands to video game software.

Figure 6:
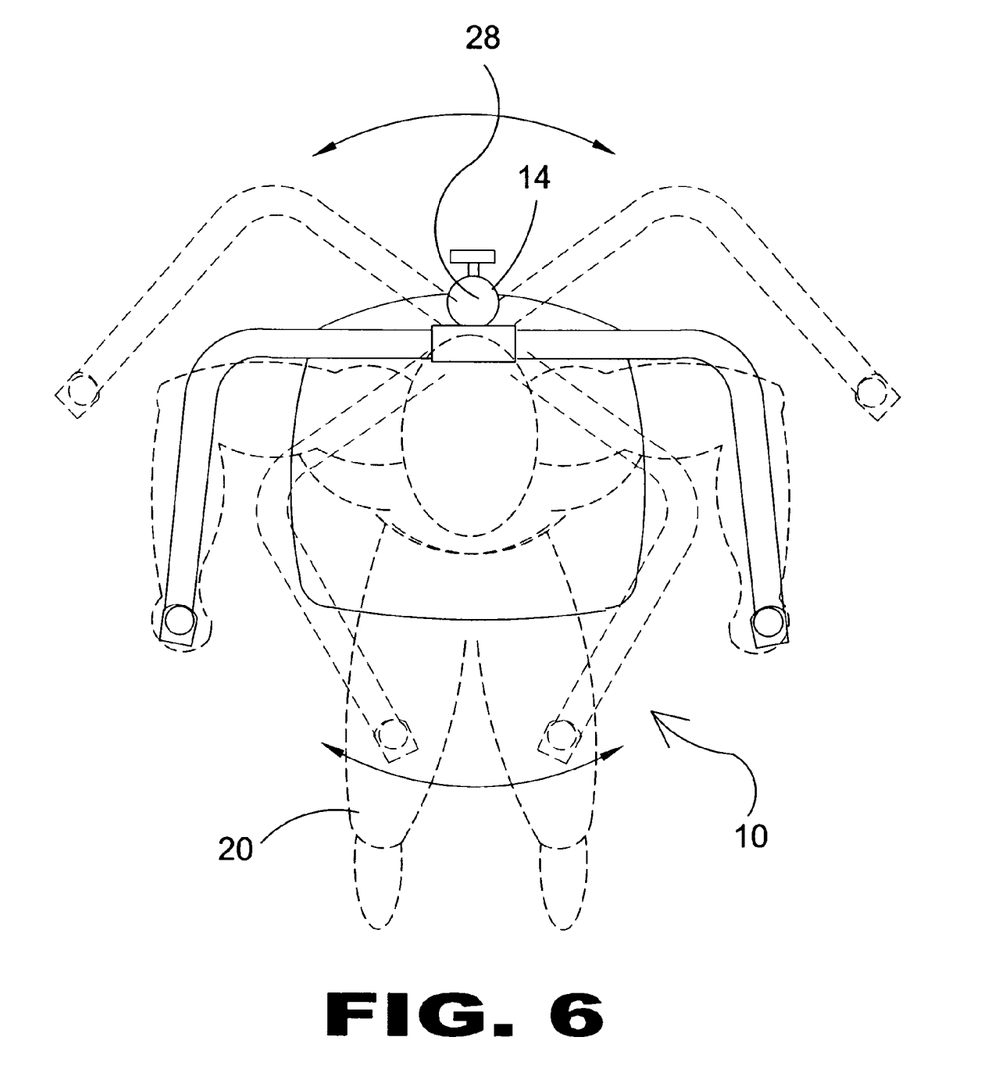
FIG. 6 is an illustrative top view of the present invention in use—motion "C".

Turning to FIG. 6, shown therein is an illustrative top view of the present invention 10 in use—motion "C". Shown is a side view of a person 20 using the exercise apparatus of the present invention 10 performing body movement through the longitudinal 28 axial plane that is imparted to the resistive member 14, which has sensor means for measuring and transmitting the movement as commands to video game software.

Figure 7:
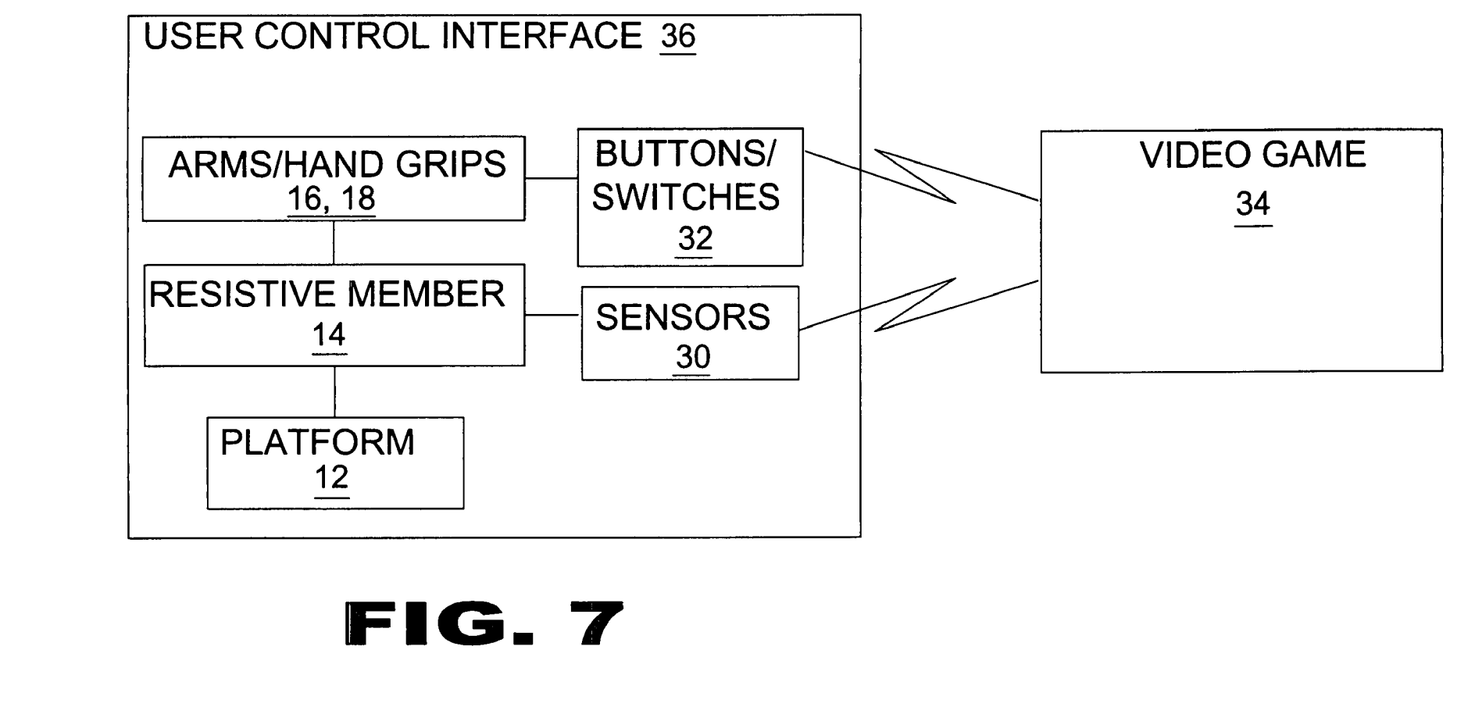
FIG. 7 is a block diagram of the present invention.

Turning to FIG. 7, shown therein is a block diagram of the present invention. Shown is a block diagram of the components of the present invention comprising a platform 12 having a stanchion-like resistive member 14 extending therefrom with arms 16 extending outwardly terminating in hand grips 18 which may include buttons and/or switches 32. Incorporated within the exercise apparatus are sensors 30 for translating body movement imparted to the resistive member that are measured and transmitted to video game software 34. The exercise device and integral sensors form the user control interface 36 to the software.

Figure 8:
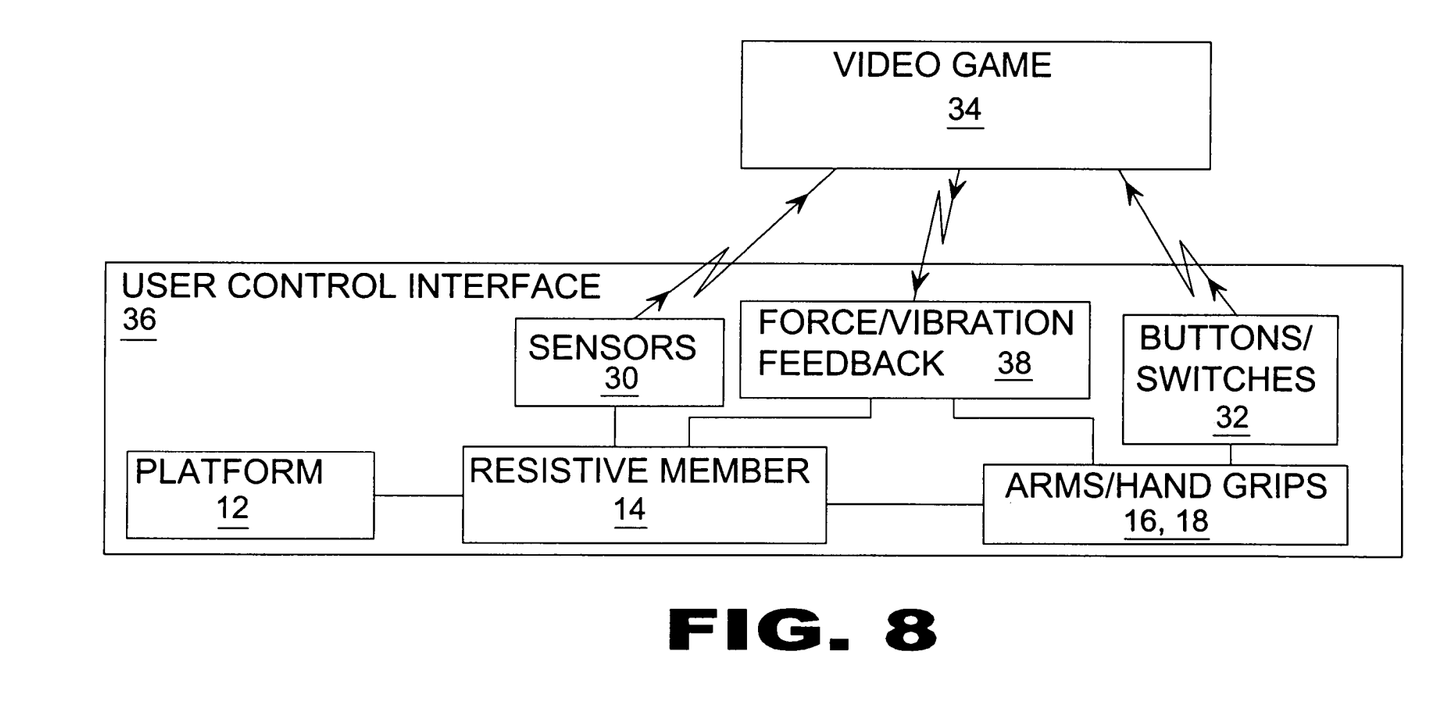
FIG. 8 is a block diagram of the present invention with force/vibration feedback.

Turning to FIG. 8, shown therein is a block diagram of the present invention with force/vibration feedback 38. Shown is a block diagram of the present invention having an additional element. The exercise apparatus is comprised of a platform 12 having a stanchion-like resistive member 14 extending therefrom with arms 16 extending outwardly terminating in hand grips 18 which may include buttons and/or switches 32. Incorporated within the exercise apparatus are sensors 30 for translating body movement imparted to the resistive member 14 that are measured and transmitted to video game software 34. Additional the exercise apparatus incorporates a force/vibration feedback mechanism 38 whereby the video game 34 can cause movement within the resistive member 14 and or hand grips 18 in response to signals received from the sensors 30 and/or hand grips 18. The exercise device, integral sensors 30 and force/vibration feedback 38 form the user control interface 36 to the software.

Figure 9:
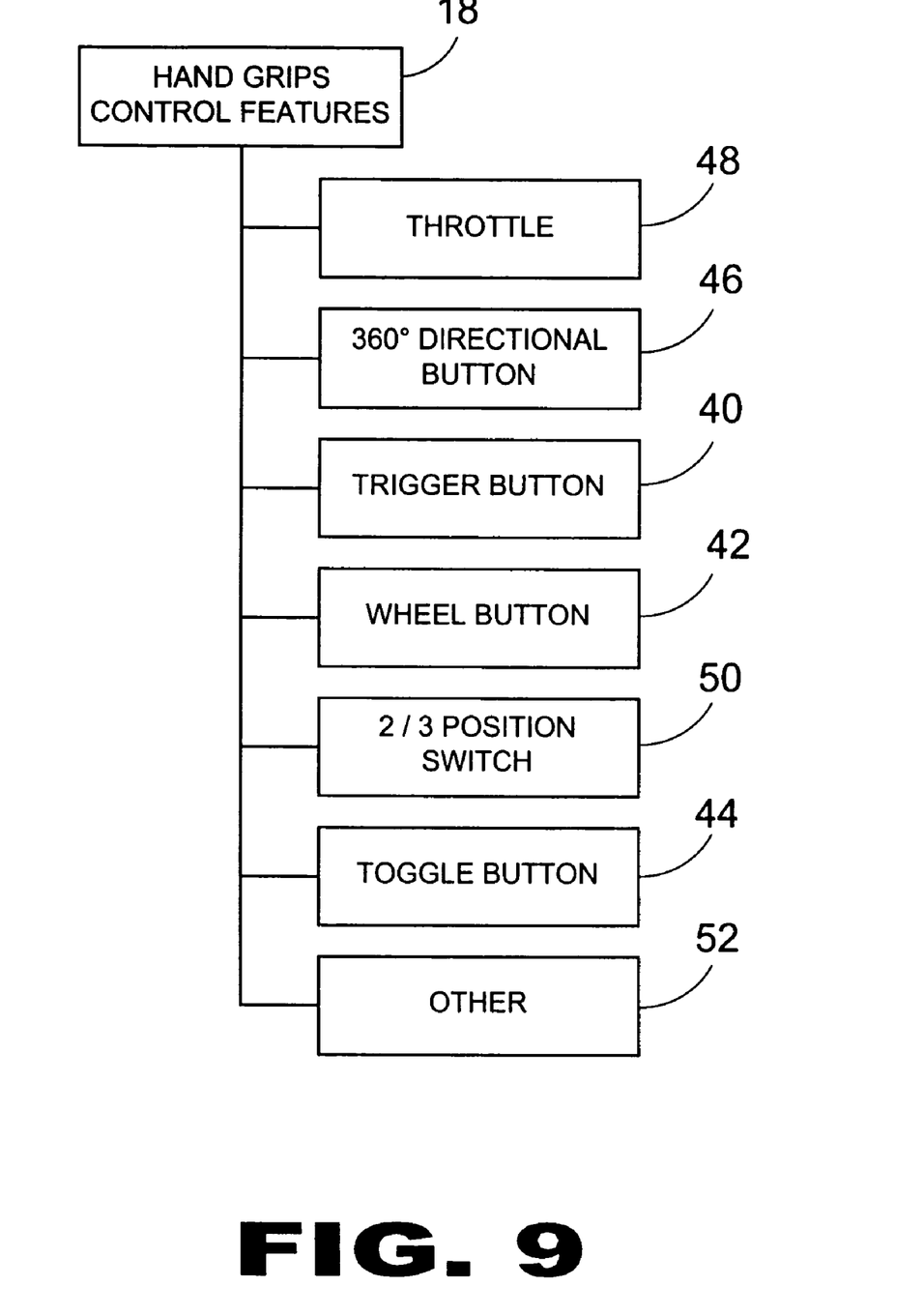
FIG. 9 is a block diagram of the present invention's hand grip control features.

Turning to FIG. 9, shown therein is a block diagram of the present invention's hand grip 18 control features. The hand grips 18 of the present invention provides various control features of typical game controllers used in conjunction with video game boxes, personal computer game software, and the like. The present invention's hand grips may include a plurality of features taken from the following group which might include a trigger 40, wheel 42, toggle 44, buttons and switches that provide means for 360° pivoting action 46, force/vibration feedback, throttle 48, ⅔ position switch 50 and other 52 user controlled commands.

I claim:

1. An apparatus for allowing a user to exercise and for providing input control signals to a video game, comprising:
   a) a base having a front anterior and a rear posterior end, a top and a bottom, and a pair of sides, wherein the user can stand or sit on said top;
   b) a vertical member being disposed on said top of said rear end of said base, said vertical member having first and second ends wherein said first end is mounted onto said base, wherein said vertical member is resistively flexible in the transverse axis, wherein said vertical member is resistively flexible in the anterior-posterior axis, wherein said vertical member is resistively flexible about the longitudinal axis;
   c) a pair of arms being disposed on said second end of said vertical member, wherein said arms each have an end, wherein said ends extend toward said front of said base, wherein said arms form a cradle about the user disposed on said base so that the back of the user is oriented toward said vertical member and the front of the user is oriented toward said ends of said arms;
   d) a hand grip being disposed on each of said ends of said arms so that the hands of the user can grasp each said hand grip;
   e) a first sensor for sensing and transmitting signals to the video game in response to movement of said vertical member by the user to permit input signals to be provided to the video game;
   f) at least one control button member disposed on said hand grip so that the user can manipulate said control button and a second sensor for transmitting signals to the video game in response to manipulation of said control button by the user; and g) a force/vibration feedback mechanism for transmitting separate signals from the video game to said vertical member and hand grip in response to signals received from said sensors for causing movement within said resistive member and hand grip.

2. The apparatus of claim 1, wherein said control member is at least one control button.

3. The apparatus of claim 1, wherein said control member is a switch being disposed on said hand grip so that the user can manipulate said control switch, and a second sensor for sensing and transmitting signals to the video game in response to manipulation of said control switch by the user.

4. The apparatus of claim 1, wherein said control member is a throttle.

5. The apparatus of claim 1, wherein said control member is at least one 360 degree control button.

6. The apparatus of claim 1, wherein said control member is at least one trigger.

7. The apparatus of claim 1, wherein said control member is at least one wheel.

8. The apparatus of claim 1, wherein said control member is at least one ⅔ position switch.

9. The apparatus of claim 1, wherein said control member is at least one toggle.

10. The apparatus of claim 1, wherein said vertical member provides resistance to a user as the vertical member is flexed by the user.

11. The apparatus of claim 10, wherein said first sensor senses movement of said vertical member in said transverse axis.

12. The apparatus of claim 11, wherein said first sensor senses movement of said vertical member in said anterior-posterior axis.

13. The apparatus of claim 12, wherein said first sensor senses movement of said vertical member in said longitudinal axis.

14. A method for allowing a user to exercise and for providing input control signals to a video game, comprising the steps of:

a) providing a base having a front anterior and a rear posterior end, a top and a bottom, and a pair of sides, wherein the user can stand or sit on said top;

b) attaching a first end of a vertical member onto the top of the rear end of the base, the vertical member being resistively flexible in the transverse axis, the anterior-posterior axis, and about the longitudinal axis;

c) attaching a pair of arms onto the second end of the vertical member, wherein the arms each have an end, wherein the ends of the arms extend toward the front of the base so as to form a cradle about the user disposed on the base so that the back of the user is oriented toward the vertical member and the front of the user is oriented toward the ends of the arms;

d) attaching a hand grip onto each end of the arm so that the hands of the user can grasp each hand grip;

e) sensing and transmitting signals to the video game in response to movement of the vertical member by the user to permit input signals to be provided to the video game;

f) providing a feedback signal from the video game to the vertical member in response to the input signals wherein the vertical member then transmits a force to the user through said vertical member;

g) mounting at least one input device onto the hand grip, said user manipulating the input device, and sensing and transmitting signals to the video game in response to manipulation of the input device by the user; and h) providing a feedback signal from the video game also to the hand grip in response to the input signals wherein the hand grip then transmits a force to the user whereby the user senses this feedback in both of the vertical member and the hand grip.

* * * * *